UNITED STATES PATENT OFFICE.

LUDWIG HAARMANN, OF ESCHERSHAUSEN, GERMANY.

METHOD OF SECURING ASPHALTIC MASTIC.

SPECIFICATION forming part of Letters Patent No. 492,197, dated February 21, 1893.

Application filed December 16, 1891. Serial No. 415,270. (No specimens.)

*To all whom it may concern:*

Be it known that I, LUDWIG HAARMANN, a subject of the Duke of Brunswick, residing at Eschershausen, near Holzminden, in the Duchy of Brunswick, German Empire, have invented new and useful Improvements in Methods of Securing Asphalt Mastic, of which the following is a specification.

My invention has reference to the application of asphalt mastic to walls and other surfaces. It is a well known fact that asphalt mastic when applied to vertical walls or ceilings rapidly peels off, since it does not combine or unite with the surfaces, whether the same be of stone, wood or other material used in the construction of buildings and the like. When applied to floors it can be removed without difficulty. Asphalt mastic being an excellent isolating material against dampness, its successful use as a plaster, mortar or cement for various purposes, especially for cellars, is highly desirable.

The object of my invention is therefore to enable asphalt mastic to be used for the several purposes for which it is so highly desirable, and to this end my invention consists in forming a solution of a bitumen or bituminous substance in a volatile solvent; applying said solution to the surface to be coated with the asphalt mastic, permitting the volatile solvent to evaporate, and finally applying the asphalt mastic in a heated state.

In carrying out my invention I prepare a solution of bitumen, or a bituminous compound, in a volatile solvent. Any one of the large varieties of bitumen, either natural or artificial, which will subsequently combine with the asphalt mastic may be used, such for instance as asphaltum elaterite, asphalt cement or mastic, or combinations of the same. The solvent may consist of bisulphide of carbon, benzine, benzole, oil of turpentine, or the like. The proportions of bitumen and solvent can not be definitely stated as said proportions vary with the different ingredients employed, but in general the solution is made as concentrated as possible, having about the consistency of sirup.

The solution is applied by means of a brush to the surface to be covered with the asphalt mastic and allowed to stand until the solvent has evaporated. The bituminous coating remaining upon the surface unites with and firmly adheres to the same. The warm asphalt mastic is then applied in the usual way and combines and incorporates with the bituminous coating. In practice I have found that this bituminous coating adheres to any kind of material used for building purposes, consequently asphalt mastic can be applied as a protective covering in many instances where its use has heretofore been impracticable, for instance to vertical walls, ceilings, arches, columns, to making joints and pointing, and also to surfaces exposed to the effects of the weather, such as the wooden pillars supporting porches, balconies and the like.

What I claim as new, and desire to secure by Letters Patent, is—

The method of securing asphalt mastic to surfaces, which consists in applying a solution of a bituminous substance to the surface, and applying the mastic after the evaporation of the solvent, substantially as described.

In testimony whereof I have signed my name to this specification in the presence of two subscribing witnesses.

LUDWIG HAARMANN.

Witnesses:
 HERMANN ARUMPELL,
 WM. G. SPALDING.